(12) United States Patent
Hook

(10) Patent No.: US 10,972,720 B2
(45) Date of Patent: *Apr. 6, 2021

(54) VIDEO LOAD BALANCING AND ERROR DETECTION BASED ON MEASURED CHANNEL BANDWIDTH

(71) Applicant: RAYTHEON COMPANY, Waltham, MA (US)

(72) Inventor: Tyler L. Hook, Waltham, MA (US)

(73) Assignee: Raytheon Company, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/746,682

(22) Filed: Jan. 17, 2020

(65) Prior Publication Data

US 2020/0228794 A1 Jul. 16, 2020

Related U.S. Application Data

(62) Division of application No. 16/161,732, filed on Oct. 16, 2018, now Pat. No. 10,554,963.

(51) Int. Cl.
*H04N 17/02* (2006.01)
*H04N 17/00* (2006.01)
(Continued)

(52) U.S. Cl.
CPC ....... *H04N 17/002* (2013.01); *G06F 13/4027* (2013.01); *H04J 3/16* (2013.01); *H04L 1/0061* (2013.01)

(58) Field of Classification Search
CPC ............ H04J 3/16; H04J 1/02; H04N 17/002; H04N 19/23; H04N 19/46; H04N 19/149;
(Continued)

(56) References Cited

U.S. PATENT DOCUMENTS 3,061,670 A 1/1961 Oster et al.
5,450,140 A 9/1995 Washino
(Continued)

OTHER PUBLICATIONS

Dorsey, "Video Signals and Slip Rings," Dec. 31, 2013, XP055609127, Retrieved from the internet: URL:https://www.moog.com/content/dam/moog/literature/MCG/312_videosignals_sliprings_whitepaper.pdf [retrieved on Jul. 26, 2019].
(Continued)

*Primary Examiner* — Trang U Tran
(74) *Attorney, Agent, or Firm* — Burns & Levinson, LLP; Joseph M. Maraia

(57) ABSTRACT

An interconnect apparatus performs real time scoring and data throughput measurement of parallel data channels. The scoring and measurement information is communicated as feedback across the interconnect. Processing circuitry in the interconnect apparatus routes data to channels that have the best performance and reduces the data rate on channels that have lower performance based on the feedback information. This provides a method of dynamic load balancing to achieve optimal video data rates in a dynamic impedance environment. The interconnect apparatus also adjusts phase and data sampling times for improved fidelity of data transported across the interface.

20 Claims, 7 Drawing Sheets

(51) Int. Cl.
*G06F 13/40* (2006.01)
*H04J 3/16* (2006.01)
*H04L 1/00* (2006.01)

(58) Field of Classification Search
CPC .............. H04N 19/103; G06F 13/4027; H04L 1/0061
USPC ......... 370/437, 442, 493; 348/192, 723, 725
See application file for complete search history.

(56) References Cited

U.S. PATENT DOCUMENTS

| | | |
|---|---|---|
| 5,808,680 A | 9/1998 | Steckhan |
| 6,067,585 A | 5/2000 | Hoang |
| 6,813,277 B2 | 11/2004 | Edmon et al. |
| 7,978,735 B2 | 7/2011 | Ezra et al. |
| 8,184,677 B1 | 5/2012 | McRobert et al. |
| 8,458,527 B2 | 6/2013 | Oldfield et al. |
| 8,839,333 B2 | 9/2014 | Jung et al. |
| 10,283,091 B2* | 5/2019 | Wu ....................... G06F 9/5055 |
| 10,349,092 B2 | 7/2019 | Bleidt et al. |
| 2013/0113777 A1 | 5/2013 | Baek et al. |
| 2015/0154943 A1 | 6/2015 | Lee et al. |
| 2018/0027266 A1* | 1/2018 | Schmidt ............... H04N 21/236 725/116 |
| 2018/0262701 A1 | 9/2018 | Woody et al. |

OTHER PUBLICATIONS

International Search Report and Written Opinion from related PCT Application No. PCT/US2019/035192 dated Aug. 5, 2019.

* cited by examiner

VIDEO LOAD BALANCING AND ERROR DETECTION BASED ON MEASURED CHANNEL BANDWIDTH

CROSS-REFERENCE TO RELATED APPLICATIONS

This application is a divisional claiming priority from co-pending U.S. patent application Ser. No. 16/161,732 filed Oct. 16, 2018 and entitled "Video Load Balancing and Error Detection Based on Measured Channel Bandwidth," the entire contents of which is incorporated by reference herein for all purposes.

FIELD OF TECHNOLOGY

The present disclosure is in the field of digital image processing and more particularly in the field of improving channel integrity for transporting high definition and ultra-high definition imagery.

BACKGROUND

Digital imaging systems that include mechanically oriented cameras and sensors commonly include signal paths that extend along rotatable mechanical booms or mounting structures. Signal paths that extend across rotatable structures typically include a slip ring interface which include a rotating side and a stationary side. For each channel in a slip ring interface, a contact on the stationary side wipes on a conductive track on the rotating side or vice versa to provide electrical contact there between.

It is often desirable to replace older cameras and/or sensors of a digital imaging system with newer generations of cameras and sensors without replacing the mounting and orienting hardware of the system. The newer cameras and sensors generally provide more advanced features and higher resolution imagery and output much more data at much higher data rates than older cameras and sensors.

Mechanical contacts such as those used in a slip ring interface can degrade and become unreliable due to wear, mechanical interference, vibration, or thermal effects that can vary channel impedances across the slip ring interface. Some degradation and the resulting variations in channel impedance may be tolerable in older video systems where a relatively small amount of data is transported across a channel. However, in more modern high definition and ultra-high definition imaging systems, the much larger amount of data being transported across a slip ring interface may be corrupted by high or varying channel impedances.

High impedance spots on a channel of a slip ring interconnect can result in a dropped line of video or even a whole dropped frame, for example. Image noise such as dropped lines or frames may cause errors or inaccuracies in many downstream processes such as tracking algorithms which are configured to process continuous imagery.

Prior attempt to improve data integrity across slip interconnects have included performing cyclic redundancy checks (CRC) at the conclusion of each video line to determine if the video line includes bit errors. When bit errors are detected the previous video line is substituted in place of the line of video with the errors. Such passive techniques are generally inadequate to provide data integrity of high speed video data transported across a slip ring interconnect. The previously known passive techniques for improving data integrity across slip ring interconnects do not adequately support transporting high speed video data over degraded slip rings, slip rings that are bandwidth limited from data line to data line, or slip ring interconnects that are temporally changing while under extreme rotations or temperatures, for example.

Other attempts to mitigate data integrity problems at a slip ring interface include replacing the slip ring with another type of interconnect, such as a cable wrap. However, the other type of interconnects generally do not have the dynamic functionality of a true slip ring. For example, a cable wrap interconnect can only be rotated through some limited angular range, whereas a slip ring interconnect can be rotated through an unlimited angular range.

Another technique for transporting high speed video data over a degraded interconnect is to compress the video data so that it can be transported over fewer channels and/or at a lower data rate. However, it is often desirable to transport uncompressed video data because compressed data generally includes undesirable artifacts and many tracker algorithms are optimized to operate with uncompressed data. Moreover, when a frame of compressed video data is corrupted, more data is lost than would be if the frame had included uncompressed video data.

SUMMARY

The disclosed method and apparatus monitors the integrity of data received at a downstream side of a video data interconnect from an upstream side of the video data interconnect for each channel of the video data interconnect. Statistical information characterizing channel integrity for each channel of the video data interconnect is accumulated by processing circuitry on the downstream side of the video data interconnect and fed back across the video data interconnect to processing circuitry on the upstream side of the video data interconnect.

According to an aspect of the present disclosure, the video data to be transported across the interconnect is distributed over the plurality of channels by the processing circuitry on the upstream side of the video data interconnect. According to another aspect of the present disclosure the data rate on each channel is adjusted by the processing circuitry on the upstream side of the video data interconnect based on the statistical information.

During horizontal blanking (time between consecutive lines of video) and vertical blanking (time between consecutive frames of video), data on each of the channels is tested by sending pseudo-random data across the interconnect at a plurality of data rates and determining bit error rates for each channel at each of the data rates.

According to an aspect of the present disclosure, near real-time video transport health scoring and max data throughput measurements are performed on each of the multiple parallel video channels in the video data interconnect. The channel scoring is used to perform automatic dynamic load balancing across multiple video transport streams to achieve optimal video data rates across a video data interconnect in a dynamic impedance environment. Data is automatically routed to the channels that have the best metrics while slowing down and reducing the load on channels that are poorer performers to avoid poor performing channels and take advantage of higher performing channels without performing compression of the video data.

Aspects of the present disclosure also allow for a dynamic clock to facilitate data centering/alignment so as to extract the optimal performance by this unique interconnect type. In addition the data phase is adjusted relative to the shared pixel clock. Digital pulses of the video data can be oversampled at a high clock rate of the dynamic clock to determine which pulse of the sampling clock is best aligned with a center of the data pulse. In other words, the sampling time can be adjusted to be centered in an eye diagram of the data signal pulses. Alternatively, or in addition, the video data can be delayed before it is sampled so that the sampling time is centered in the eye diagram of the data signal pulses.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures.

DETAILED DESCRIPTION

The disclosed system and method performs status checks on parallel channels of data bus interface such as a video data interface and optimizes throughput across the data bus interface based on the status checks. Throughput is optimized by routing data to different channels, changing the data rates of selected channels, and/or changing the frequency at which data is transmitted across each individual channel in the parallel channel environment, for example.

The disclosed system and method determines the maximum data rate at which each channel can reliably transport data. More data is routed to channels that can support higher data rates and less data is routed to channels that may incur errors at the higher data rates, for example. Channel integrity is continuously or periodically monitored because it generally changes over time in a dynamic interface. A rotating slip ring interface may have varying channel impedances and dead spots at various angels of rotation, for example.

In most video systems, image data for each image is transported as a sequence of frames in which each frame is made up of a sequence of lines. Traditionally, an image data signal transporting image data includes some small blanking time between each line and between each video frames. The blanking time in an image data signal does not include the image data representing pixels of a line or frame, but may include some encoded information about the image data and/or about the image data signal, for example.

The disclosed system and method performs the channel status checks and controls data routing and data rate management of channels during the blanking times to take advantage of bandwidth during the blanking times, which is otherwise underutilized.

Blanking time has historically been used to allow the electron beam to raster its way to the beginning of the next line/row on a cathode ray tube (CRT) display. In general, blanking times are determined by the camera/sensor, and in some cases the camera or system may encode metadata, or ancillary data in this dead space/blanking time. For instance, digital audio data, timestamps, etc. is sometimes transported in this dead time between lines of video. According to aspects of the present disclosure this dead time is used to transmit a priori test patterns at multiple clock rates to determine the quality of the link across a slip-ring or dynamic interconnect before sending the next line/frame of video. Thus, maximizing the possibility that the image data will be correctly transported without/minimal errors.

Figure 1:
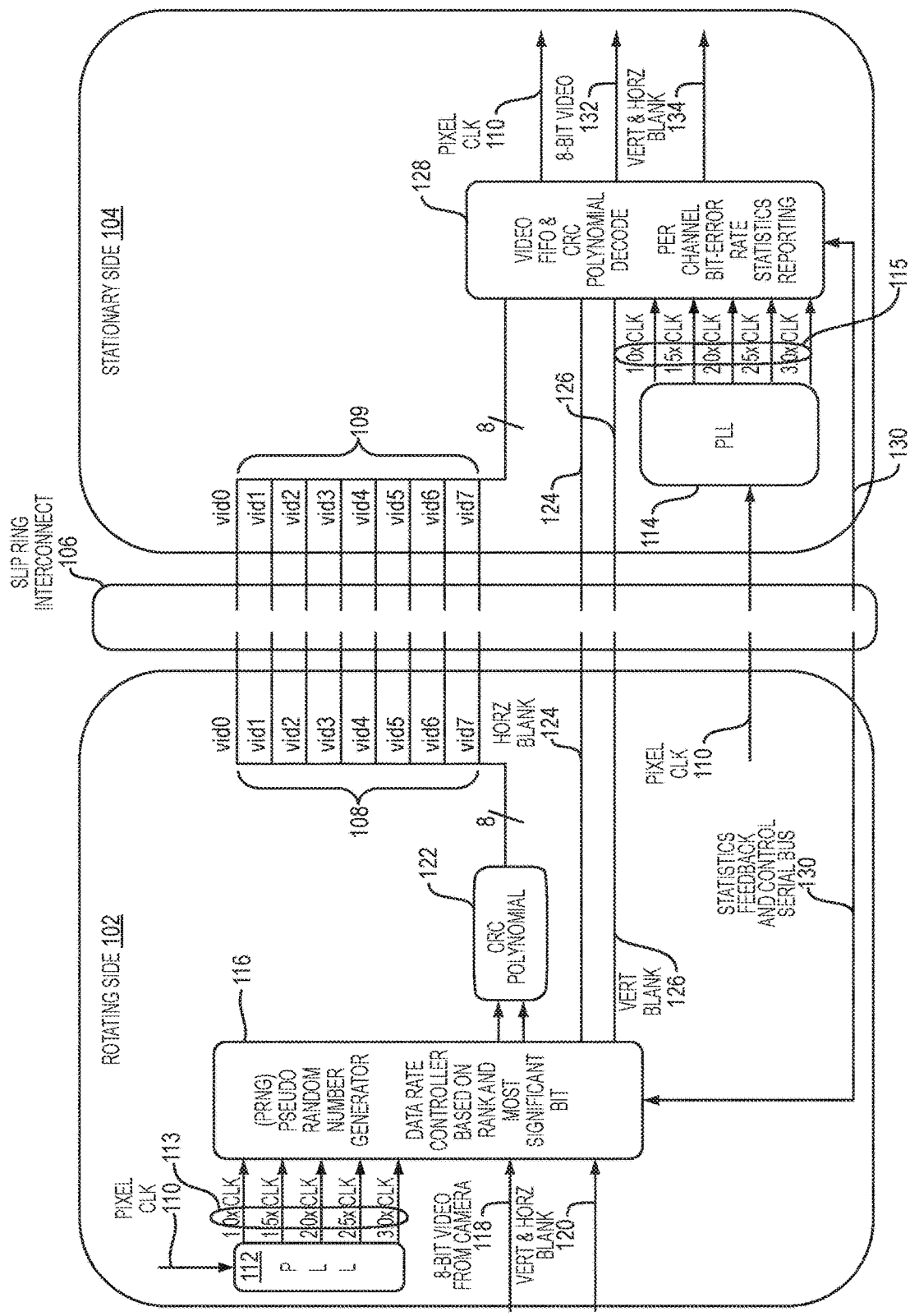
FIG. 1 is a schematic block diagram illustrating a system for video load balancing and error detection based on measured channel bandwidth according to an aspect of the present disclosure.

FIG. 1 illustrates a system for video load balancing and error detection based on measured channel bandwidth. The system includes a data bus interconnect 106 that couples a plurality of signal lines between an upstream processing module 102 and a downstream processing module 104. In an illustrative embodiment, the data bus interconnect 106 may be a slip ring interface, for example. The data bus interconnect 106 couples the signal lines, which include a plurality of video output paths 108 of the upstream processing module 102 coupled to a plurality of video input paths 109 of the downstream processing module 104. In the illustrative embodiment, the upstream processing circuitry 102 is coupled to a rotating side of a slip ring interconnect, and the downstream processing module 104 is coupled to a stationary side of the slip ring interconnect.

A pixel clock signal 110 in the upstream processing module 102 is input to phase locked loop circuitry 112 in the upstream processing module 102. The pixel clock signal 110 is also transported across the data bus interface 106 and coupled to phase locked loop circuitry 114 in the downstream processing module 104. The phase locked loop circuitry 112, 114 in both the upstream processing module 102 and the downstream processing module 104 outputs a plurality of clock signals 113, 115 having clock rates that are multiples of the rate of the pixel clock signal 110. In an illustrative embodiment, the plurality of phase locked loop circuitry clock signals 113, 115 have clock rates of 1.0×, 1.5×, 2.0×, 2.5× and 3.0× multiples of the rate of the pixel clock signal 110. The phased lock loop circuitry 112, 114 ensures that plurality of clock signals 113 in the upstream processing module 102 are synchronized with the corresponding clock signals 115 in the downstream processing module 104.

The upstream processing module 102 includes upstream processing circuitry 116 coupled to the upstream module's phase locked loop circuitry 112. The upstream processing circuitry 116 receives the plurality of output clock signals 113 from the upstream module's phase locked loop circuitry 112. The upstream processing circuitry 116 receives video data signals on an upstream video input path 118 from a camera or sensor and also receives a vertical and horizontal blanking signal from the camera or sensor on an upstream blanking signal path 120.

The upstream processing circuitry 116 includes a pseudo random number generator for generating a test signal to test a plurality of video channels on the video output paths 108.

The upstream processing module 102 also includes cyclical redundancy check circuitry 122 coupled between the upstream processing circuitry 116 and the plurality of video output paths 108. The plurality of video output paths 108 transport a plurality of channels of video data from the cyclical redundancy check circuitry 122 across the data bus interconnect 106 to the plurality of downstream video input paths 109 of the downstream processing module 104.

A horizontal blanking signal path 124 and a vertical blanking signal path 126 transport a horizontal blanking signal and a vertical blanking signal across the data bus interconnect 106 to downstream processing circuitry 128 in the downstream processing module 104.

According to an aspect of the present disclosure, the upstream processing circuitry 116 includes video encoding circuitry and data rate control circuitry for each of the video output paths 108. The downstream processing circuitry 128 is coupled to the phase locked loop circuitry 114 in the downstream module 104. The downstream processing circuitry 128 receives the plurality of output clock signals 115 from the phase locked loop circuitry 114. The downstream processing circuitry 128 receives video data from the plurality of downstream video input paths 109.

The downstream processing circuitry 128 includes video decoding circuitry and channel integrity monitoring circuitry. The channel integrity monitoring circuitry is coupled across the video channel interconnect via a statistics feedback and control path 130 to data rate control circuitry in the upstream processing circuitry 116. In an illustrative embodiment, the statistics feedback and control path 130 is implemented as a bi-directional serial bus which transports data across the data bus interconnect 106 at a relatively slow rate compared to the rate that video data is transported across the data bus interconnect 106.

According to an aspect of the present disclosure, for every frame of video data that is transported across the data bus interconnect 106, the channel integrity monitoring circuitry in the downstream processing circuitry 128 monitors the integrity of each of the video channels received on the video input paths 109 and compiles statistics that characterize the channel integrity of each of the video channels. The statistics are fed back to the data rate control circuitry over the statistics feedback and control path 130. The statistics are compiled much faster than they can be transported to the data rate control circuitry, which performs adjustments based on those statistics. In an illustrative embodiment, the data rate on statistics feedback and control path 130 is on the order of about 30 Hz to 120 Hz, for example.

In an illustrative embodiment in which the statistics feedback and control path 130 operates at 60 Hz, the data rate provides a time period of 16 milliseconds in which the channel integrity monitoring circuitry can send the channel integrity statistics to the data rate control circuitry. Due to its low data rate, the statistics feedback and control path 130 is not significantly affected by the signal integrity issues that can detrimentally affect video data being transported across the data bus interconnect 106.

In general, data integrity across the data bus interconnect 106 can vary significantly from time to time due to variable contact impedances on various channels of a mechanical connection, for example. High or varying impedance resulting in poor data integrity on a channel may be caused by worn portion of a data bus interconnect 106, such as a slip ring interconnect or by environmental conditions such as icing, and/or thermal expansion and contraction of the data bus interconnect 106. Because channel integrity can vary from time to time, the disclosed channel integrity monitoring circuitry constantly updates the channel integrity statistics and provide feedback information including the updated statistics to the data rate control circuitry.

The channel integrity statics are used by the data rate control circuitry to distribute video data across the video output paths 108 and to control data rates on each of the video output paths 108. The controlled distribution of the video data and controlled data rates on the video out paths 108 based on the channel integrity statics significantly mitigates signal integrity issues on the data bus interconnect 106.

In an illustrative embodiment, a portion of the video data input signal is distributed to each video transport channel at a data rate that is appropriate for the channel. The amount of video data in the portion and the data rate of the portion is based on the channel integrity information associated with the corresponding video data transport channel. The portions of the video data input signal are received at the downstream processing module of the interconnect apparatus, on the corresponding video transport channels. According to an aspect of the present disclosure, the portions of the video data input signal received on the plurality of video transport channels are recombined, according to how they had been distributed based on the channel integrity information associated with each channel to reproduce the video data input signal.

In one example, it is desirable to transport eight bits of data across a slip ring interface at a rate of 100 MB per second. This corresponds to transporting eight bits of data every 10 ns, where the pixel clock runs at 100 MHz. If it is determined based on feedback statistics from the last frame that six out of eight video transport channels could reliably send data every 4 ns (250 MHz) or more, and two of the video transport channels were unable to reliably send any data, then the video data is redistributed according to aspects of the present disclosure. In this example, the downstream processing module would instruct the upstream processing module to route the eight bits of data down the six high bandwidth channels. More specifically, a routing table generated by the downstream processing module would instruct the upstream processing module to send two bits of data on the six high bandwidth video transport channels at a clock rate of 200 MHz or period of 5 ns. This provides two bits of data on each channel every 10 ns, which effectively doubles the transport rate of the six good video transport channels.

The downstream processing circuitry 128 generates an uncompressed reproduction of the video data signals that were received on the upstream video input paths 109. The reproduction of the video data signals are output from the downstream processing circuitry 128 on a downstream video output path 132 along with a reproduction of the vertical and horizontal blanking signal, which is provided on a downstream blanking signal path 134. The downstream processing circuitry 128 also outputs the pixel clock signal 110.

According to an aspect of the present disclosure, the downstream processing module 104 is also configured to measure and correct the phase of video data received on the video input paths 109 relative to the time that the video data is sampled. The downstream processing circuitry 128 can perform out of phase sampling of video data on some video output paths 108 and video input paths 109 if some of the video output paths 108 or video input paths 109 are physically longer than other video input paths 108 or video output paths 109, for example. If uncorrected, this can cause the sampling time of video data to be too close to the time of one to zero transitions in the video data on some channels, which prevents accurate reproduction of the video data by the downstream processing module 104.

The phase the video data on a video output paths 108 can be adjusted in the upstream processing module 102 by selectively delaying the video data by some amount in response to phase measurement information received from the downstream processing module 104. In an illustrative embodiment the video data signal on a selected video transport channel is delayed by increasing increments to determine the phase where the downstream processing module 104 begins to detect an increase in errors.

Alternatively, the sampling time may be incrementally changed relative to the data signal by the downstream processing module 104 to determine the phase where the downstream processing module 104 begins to detect errors. Either of these techniques can be used to adjust the phase of the video data signal relative to the sampling time so that a sampling time is optimally synchronized with the video data signal for each channel.

The ability to adjust the data's phase with respect to the pixel clock signal 110 is commonly built in on to many types of FPGAs, typically called an IO delay block for alignment of data to a clock signal. The IO delay block typically delays when a data signal is sampled.

During a video blanking time for each channel, the disclosed apparatus adjusts the sampling times relative to the video data on each video input path 109 by altering sampling times or delaying video data being written to the video output paths 108.

In an illustrative embodiment, the downstream processing module 104 uses the pixel clock frequency multiplied by 3× to oversample the video data and determine where the optimal sampling time for sampling inside the eye diagram for each channel. The optimal sampling timing is reported as feedback to the upstream processing module 104 vie the statistics feedback and control path 130. This information can be used to optimize the sampling time on each channel and/or to delay the video data such that the sampling occurs at an optimal time.

In an illustrative embodiment, the statistics feedback and control path 130 is implemented as a bi-directional serial bus which transports data across the data bus interconnect 106 at a relatively slow rate compared to the rate that video data is transported across the video channel interconnect. In an illustrative embodiment, the data rate on the serial bus is on the order of about 30 Hz to 120 Hz and the video data rate, for example.

Figure 2:
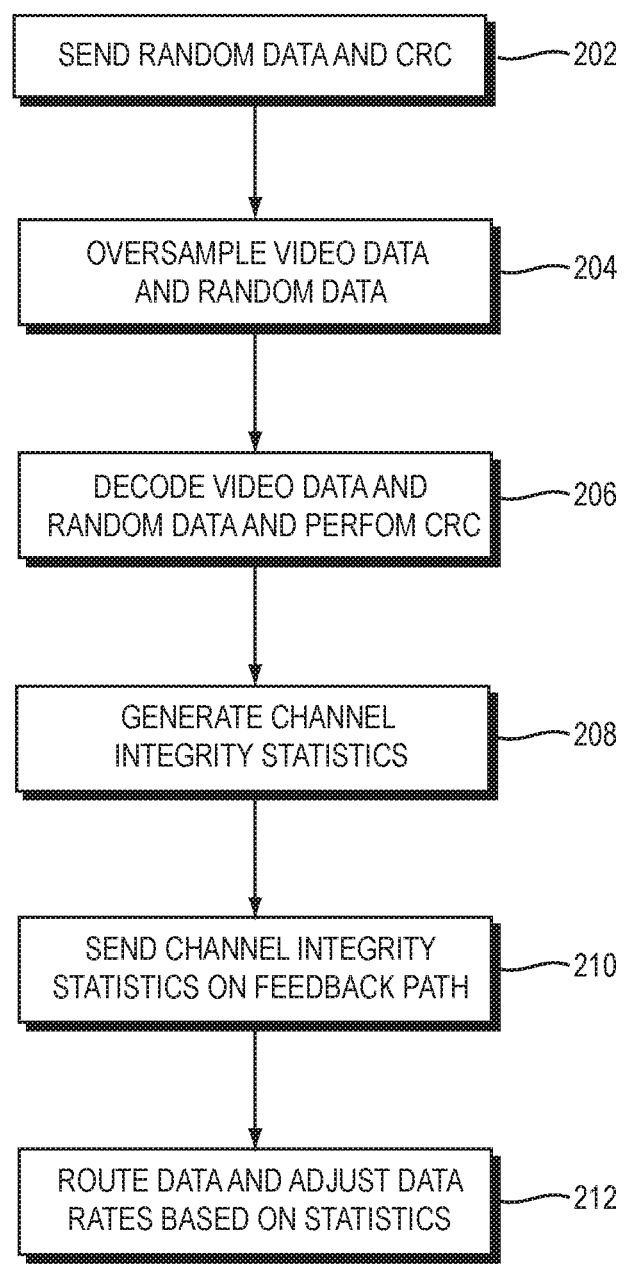
FIG. 2 is a process flow diagram showing a method of using blanking time to assess channel health during video blanking times according to an aspect of the present disclosure.

A method of using blanking time to assess channel health during video blanking times according to an aspect of the present disclosure is described with reference to FIG. 2.

At block 202 a random data test signal and cyclical redundancy checks are sent for every line at various clock rates during the blanking times. In an illustrative embodiment, the random data and cyclical redundancy checks are sent at the various clock rates every 128 clock cycles. The random data and cyclical redundancy checks are sent from the upstream processing circuitry 116 and the cyclical redundancy check circuitry 122, respectively, to the downstream processing circuitry 128 via the video output paths 108 and video input paths 109.

At block 204, the video data and random data received by the downstream processing circuitry 128 are continuously oversampled at the various clock rates.

At block 206, the video data and random data are decoded by the downstream processing circuitry 128 and a cyclical redundancy check is performed on the random data by the downstream processing circuitry 128.

At block 208, the downstream processing circuitry 128 generates channel integrity statistics during the blanking times for each channel based on the cyclical redundancy checks of the random data.

At block 210, the channel integrity statistics are sent by the downstream processing circuitry 128 once per frame via the statistics feedback and control path 130 to the upstream processing circuitry 116.

At block 212, the upstream processing circuitry 116 routes the video data to selected video data output paths 108 and adjusts the data rates of each of the video data output paths 108 based on the channel integrity statistics received from the downstream processing circuitry 128.

Although illustrative embodiments of the disclosed system and method are described herein as implementing cyclical redundancy checks to assess data integrity, it should be understood that various alternative techniques of data integrity checking are well known and may be used instead of or in addition to cyclical redundancy check within the scope of the present disclosure.

Figure 3:
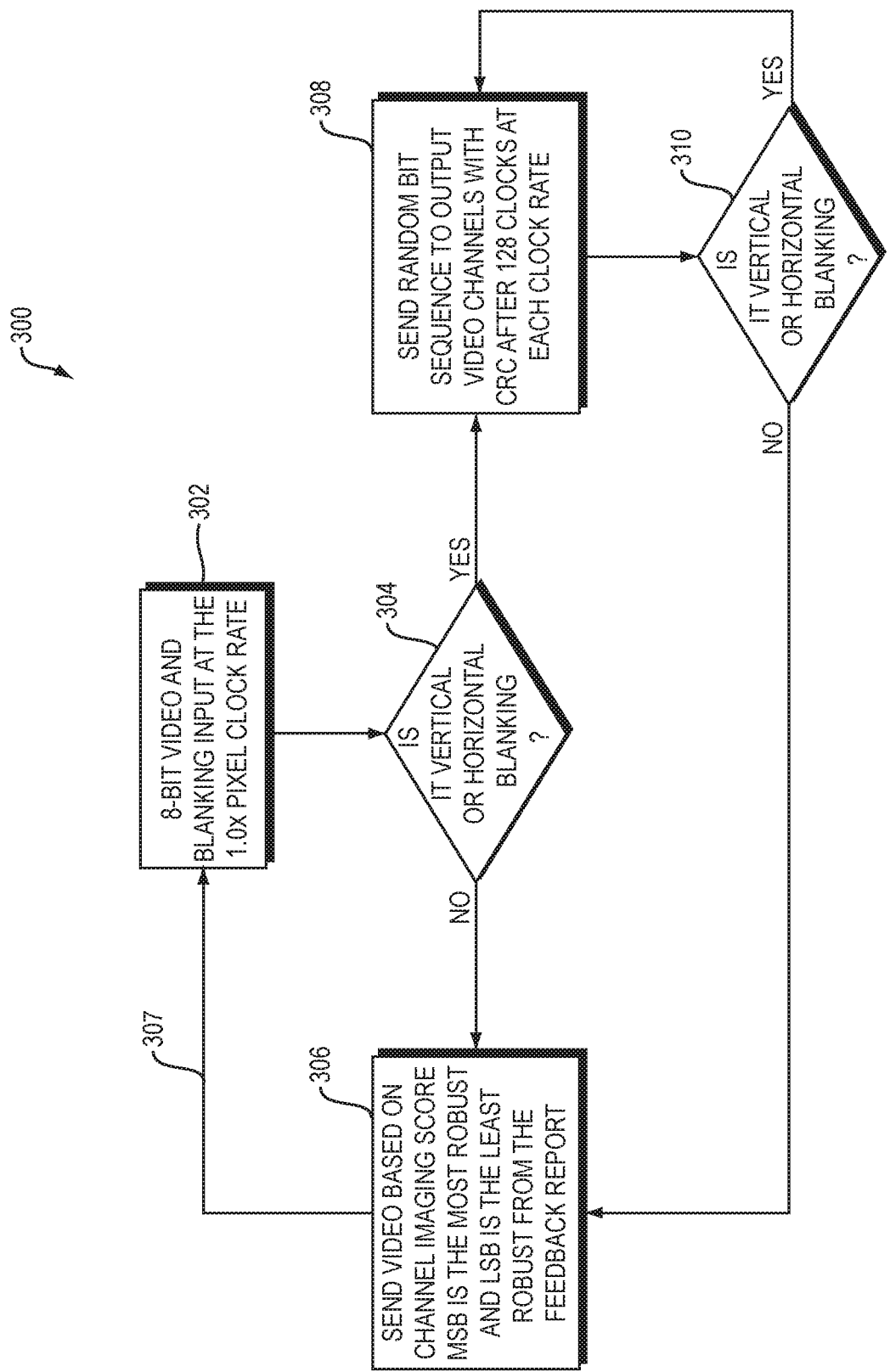
FIG. 3 is a diagram illustrating process flow in an upstream state machine that may be implemented to facilitate measuring channel integrity according to an aspect of the present disclosure.

An example of an upstream state machine 300 that may be implemented in a field programmable gate array (FPGA) in the upstream processing module 102 once per frame to facilitate measuring channel integrity according to an aspect of the present disclosure is described with reference to FIG. 3.

At block 302 an 8-bit video signal and blanking signal is received at the 1.0× clock rate. The 8-bit video signal is received by the upstream processing module 102 from an external camera or sensor via the upstream video input path 118. The blanking signal is received by the upstream processing module 102 from the camera or sensor via the upstream blanking signal path 120.

At block 304, the upstream state machine 300 determines from the blanking signal whether a vertical or horizontal blanking period is occurring. Blanking times can be determined by a high or low signal level coming from a sensor or camera to indicate valid pixel data and indicate where each pixel is located. Generally the most important information in a blanking signal identifies the first pixel of each frame, the last pixel in a frame, and the first and last pixels for each row or line of video. In one example, a "high" level on both horizontal and vertical blank indicates a valid image pixel (i.e. not blanking). For a 30 Hz frame rate imaging system, the vertical blanking signal will transition "high" at the first valid pixel in the frame and stay "high" until the last pixel in the frame, or toggle at a 30 Hz rate. The horizontal blank signal will transition "high" at the first pixel in a line/row, and stay "high" until the last valid pixel in that line/row. So for each line/row of video there is some amount of blanking.

At block 306, when a vertical or horizontal blanking period is not occurring, video is sent based on channel integrity information. For example, the upstream processing circuitry 116 routes the video data to selected video data output paths 108 and adjusts the data rates of each of the video data output paths 108 based on the channel integrity statistics received from the downstream processing circuitry 128, as described above with regards to FIG. 2. At step 307, the upstream state machine 300 jumps back to block 302.

At block 308, when a vertical or horizontal blanking period is occurring, a random bit sequence is sent by the upstream processing circuitry 116 to the video data output paths 108 with CRC data. In an illustrative embodiment, the random bit sequence and CRC data are sent after a predetermined number of cycles and at a number of different clock rates that are multiples of the pixel clock 110. The predetermined number of cycles gives both sides of the video processing system some small amount of time to reset any counters and/or state machines, as well as send any meta data or ancillary data before the disclosed calibration routine is implemented. In an illustrative embodiment, each horizontal blanking may include 1024 clock cycles and 128 clock cycles may be used to transport metadata, for example. The 128 clock cycles are sufficient to provide 128 bytes of data on an 8-bit, video channel in which to send timestamps and some position/pointing data. This leaves 896 clock cycles to perform the disclosed calibration routine.

At block 310, the upstream state machine 300 again determines whether vertical or horizontal blanking period is occurring in the same manner as in block 304, for example. When a vertical or horizontal blanking period is occurring, the upstream state machine 300 jumps to block 308. When a vertical or horizontal blanking period is not occurring, the upstream state machine 300 jumps to block 306.

Figure 4:
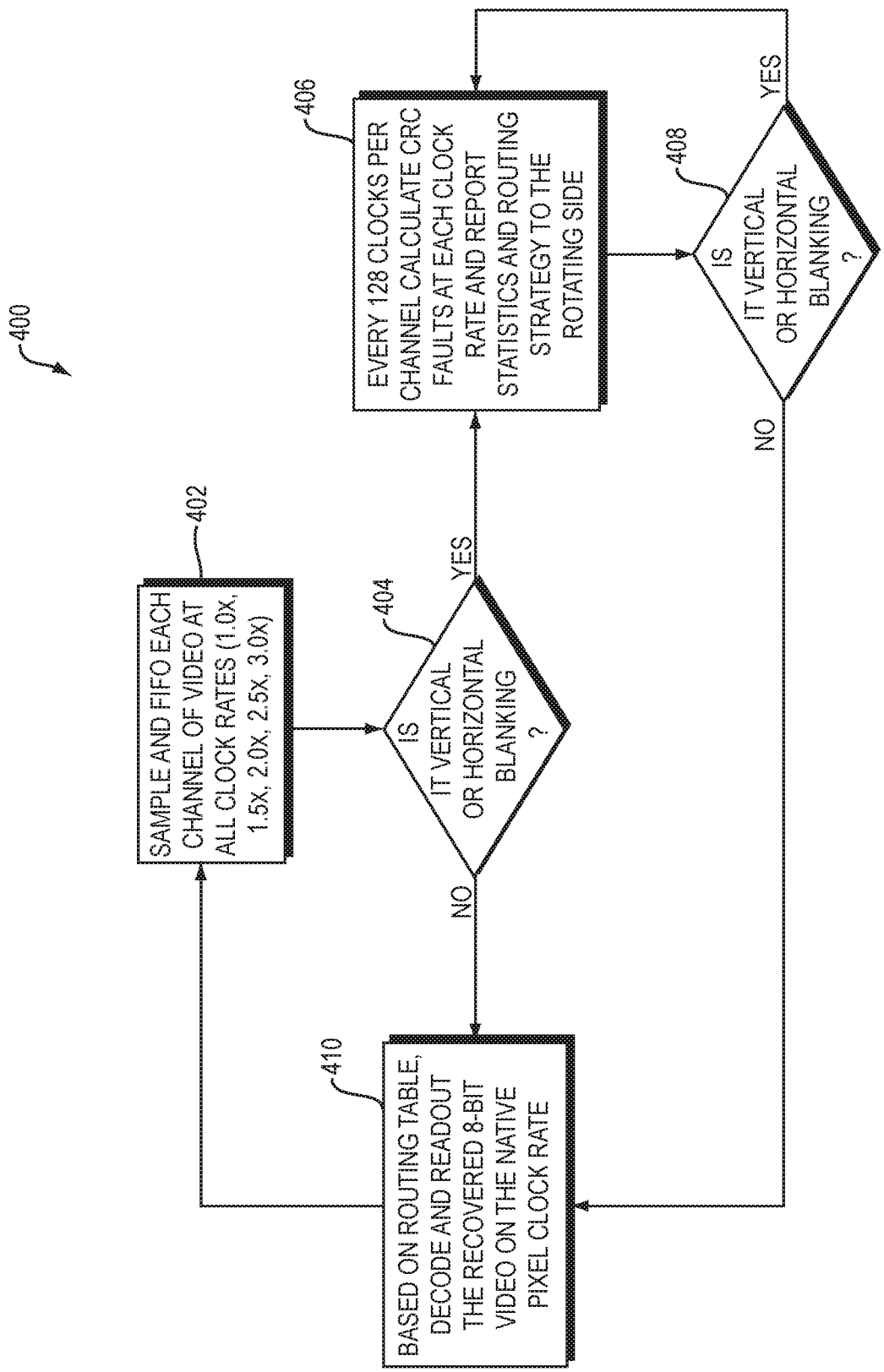
FIG. 4 is a diagram illustrating process flow in a downstream state machine that can be implemented to perform the channel integrity measurements according to an aspect of the present disclosure.

An example of a downstream state machine 400 that can be implemented an FPGA in the downstream processing module 104 to perform the channel integrity measurements according to an aspect of the present disclosure is described with reference to FIG. 4.

At block 402, each channel of video is sampled and buffered. According to an aspect of the present disclosure, the sampling is performed by the downstream processing circuitry 128 at a number of different clock rates that are multiples of the pixel clock 110 rate. For example, in an illustrative embodiment, the sampling is performed at 1.0×, 1.5×, 2.0×, 2.5×, 3.0× the clock rate of the pixel clock 110. Sampling at the plurality of clock rates generates a plurality of data streams that can be compared with each other to determine a highest sampling clock rate that can be used without an unacceptable error rate on each channel. The channel integrity statistics generated at block 208 (FIG. 2) may include the highest sampling clock rate on each channel, for example.

At block 404, the downstream state machine 400 determines whether a vertical or horizontal blanking period is occurring.

At block 406, when vertical or horizontal blanking is occurring, CRC faults are calculated at every 128 clock cycles per channel at each of the different clock rates and statistics and routing strategy are reported to the upstream processing module 102. The decoding of video data and random data and performing CRC at block 206 (FIG. 2) may include the sampling performed at block 402 and the calculating CRC faults at block 406 of the downstream state machine 400, for example. The sampling and performing CRC are performed in the downstream processing circuitry 128 (FIG. 1).

Although various aspects and embodiments of the present disclosure are described as implementing cyclic redundancy checks (CRCs) to evaluate errors on the video output paths 108 and video input paths 109, it should be understood that various alternative error checking techniques such as parity checks, checksums and the like may be used instead or in addition to CRCs within the scope of the present disclosure.

At block 408, the downstream state machine 400 determines whether a vertical or horizontal blanking period is occurring. When a vertical or horizontal blanking period is occurring, the downstream state machine 400 jumps back to block 406. When a vertical or horizontal blanking period is not occurring, the downstream upstream state machine 400 jumps to block 410.

At block 410, when a vertical or horizontal blanking period is not occurring, whether checked as part of block 404 or block 408, the recovered 8-bit video is decoded based on a routing table and output at the pixel clock rate.

A method for interconnecting video signal pathways according to an illustrative embodiment of the present disclosure is described with reference to FIG. 5. An apparatus for performing the disclosed method is described below with reference to FIG. 6. At block 502, the method includes receiving at an upstream processing module of an interconnect apparatus a feedback signal from a downstream processing module of the interconnect apparatus via a feedback path between the upstream processing module of the interconnect apparatus and the downstream processing module of the interconnect apparatus. In an illustrative embodiment, the feedback path may be the statistics feedback and control path 130 described herein with reference to FIG. 1. The feedback signal includes channel integrity information for each of a plurality of video transport channels extending from the upstream processing module of the interconnect apparatus to the downstream processing module of the interconnect apparatus, for example.

At block 504, the method includes receiving at the upstream processing module of the interconnect apparatus a video data signal from one or more cameras coupled to the upstream processing module of the interconnect apparatus. In an illustrative embodiment, the video data input is received by the upstream processing circuitry 116 described herein with reference to FIG. 1.

At block 506, the method includes distributing a portion of the video data input signal to the video transport channel for each of the video transport channels. The amount of video data in the portion and the data rate of the portion is based on the channel integrity information associated with the channel.

At block 508, the method includes coupling a pixel clock to phased locked loop circuitry on the upstream processing module of the interconnect apparatus and to phased locked loop circuitry on the downstream processing module of the apparatus. The phased locked loop circuitry on the upstream processing module of the interconnect apparatus and the phased locked loop circuitry on the downstream processing module of the apparatus generate a plurality of phase locked clock signals having predetermined multiples of the pixel clock rate At block 510, the method includes determining whether the video data input signal represents a video blanking period. The blanking signals and clock are separate from the video data lines. The blanking signals are aligned temporally with the pixel data so that when both the horizontal and vertical blanking signals transition "high" this indicates the first pixel in a frame, and when they both go "low" this indicates the last pixel in the frame. If vertical blank in "high" and horizontal blank transitions "low" this indicates the last pixel in a line/row. The blanking signals identify when blanking is occurring and toggle at low rates, typically in the Hz to KHz ranges, which is slow when compared to the pixel and data rates.

At block 512, the method include sending a random or pseudorandom signal during the video blanking period along with cyclical redundancy check information corresponding to the random or pseudorandom signal on the channel from the upstream processing module of the interconnect apparatus to the downstream processing module of the interconnect apparatus for each of the video transport channels. In an illustrative embodiment, the method includes sending the random or pseudorandom signals along with the cyclical redundancy check information at each of the predetermined multiples of the pixel clock rate.

At block 514, the method includes receiving at the downstream processing module of the interconnect apparatus, on each of the video transport channels the portion of the video data input signal distributed to the corresponding video transport channel, and recombining the portions of the video data input signal received on the plurality of video transport channels based on the channel integrity information associated with each channel.

At block 516, the method includes receiving at the downstream processing module of the interconnect apparatus on each of the video transport channels the random or pseudorandom signals and the cyclical redundancy check information associated with the corresponding video transport channels at each of the predetermined multiples of the pixel clock rate.

At block 518, the method includes performing a channel integrity check for each of the video transport channels based on the random or pseudorandom signals and the cyclical redundancy check information at each of the predetermined multiples of the pixel clock rate and determining an updated channel integrity information for each of the video transport channels based on channel integrity check.

At block 520, the method includes communicating the updated channel integrity information for each of the plurality transport channels from the downstream processing module of the interconnect apparatus to the upstream processing module of the interconnect apparatus.

In an illustrative embodiment performing the channel integrity check involves performing a cyclical redundancy check for each of the predetermined multiples of the pixel clock rate, determining a maximum one of the predetermined multiples of the pixel clock rate clock rates at which the cyclical redundancy check determines a bit error rate below a predetermined threshold of data integrity, and including the maximum data rate of the channel in the updated channel integrity information.

In the illustrative embodiment, the updated channel integrity information identifies for each of the video transport channels a maximum data rate of the channel as the maximum one of the predetermined multiples of the pixel clock rate at which the cyclical redundancy check determines the bit error rate below the predetermined threshold of data integrity.

At block 522, the method includes for each of the video transport channels, updating the data rate of the channel to the maximum data rate of the channel identified in the updated channel integrity information associated with the channel and/or updating the amount of video data in the portion based on the updated channel integrity information associated with the channel.

According to an aspect of the present disclosure, communicating the updated channel integrity information to the upstream processing module of the interconnect apparatus is performed only during the video blanking period.

At block 524, the method includes performing a phase check during the blanking time for each of the video transport channels at a predetermined multiple of the pixel clock rate that oversamples the random or pseudorandom signals and the cyclical redundancy check information, and determining a phase adjustment for each of the video transport channels based on the corresponding phase check. As described above with respect to FIG. 1, the phase the video data on a video output paths 108 can be adjusted in the upstream processing module 102 by selectively delaying the video data by some amount in response to phase measurement information received from the downstream processing module 104. In an illustrative embodiment the video data signal on a selected video transport channel is delayed by increasing increments to determine the phase where the downstream processing module 104 begins to detect an increase in errors.

At block 526, the method includes communicating the phase adjustment in the feedback signal from the downstream processing module of the interconnect apparatus to first downstream processing module of the interconnect apparatus.

At block 528, the method includes adjusting the phase for data transported on each of the video transport channels based on the phase adjustment received from the downstream processing module of the interconnect apparatus to first downstream processing module of the interconnect apparatus.

Figure 5:
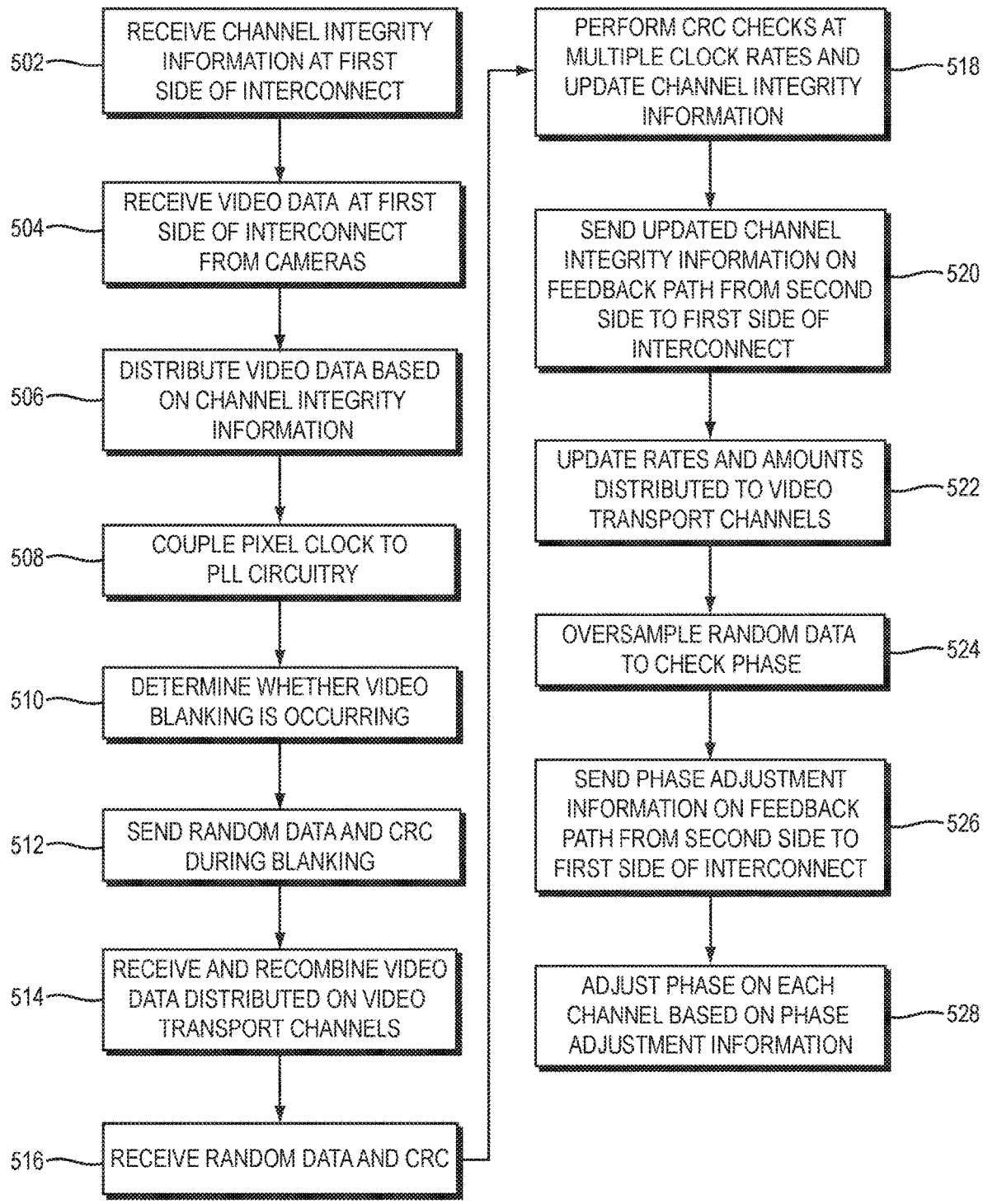
FIG. 5 is a process flow diagram illustrating a method for interconnecting video signal pathways according to an illustrative embodiment of the present disclosure.
Figure 6:
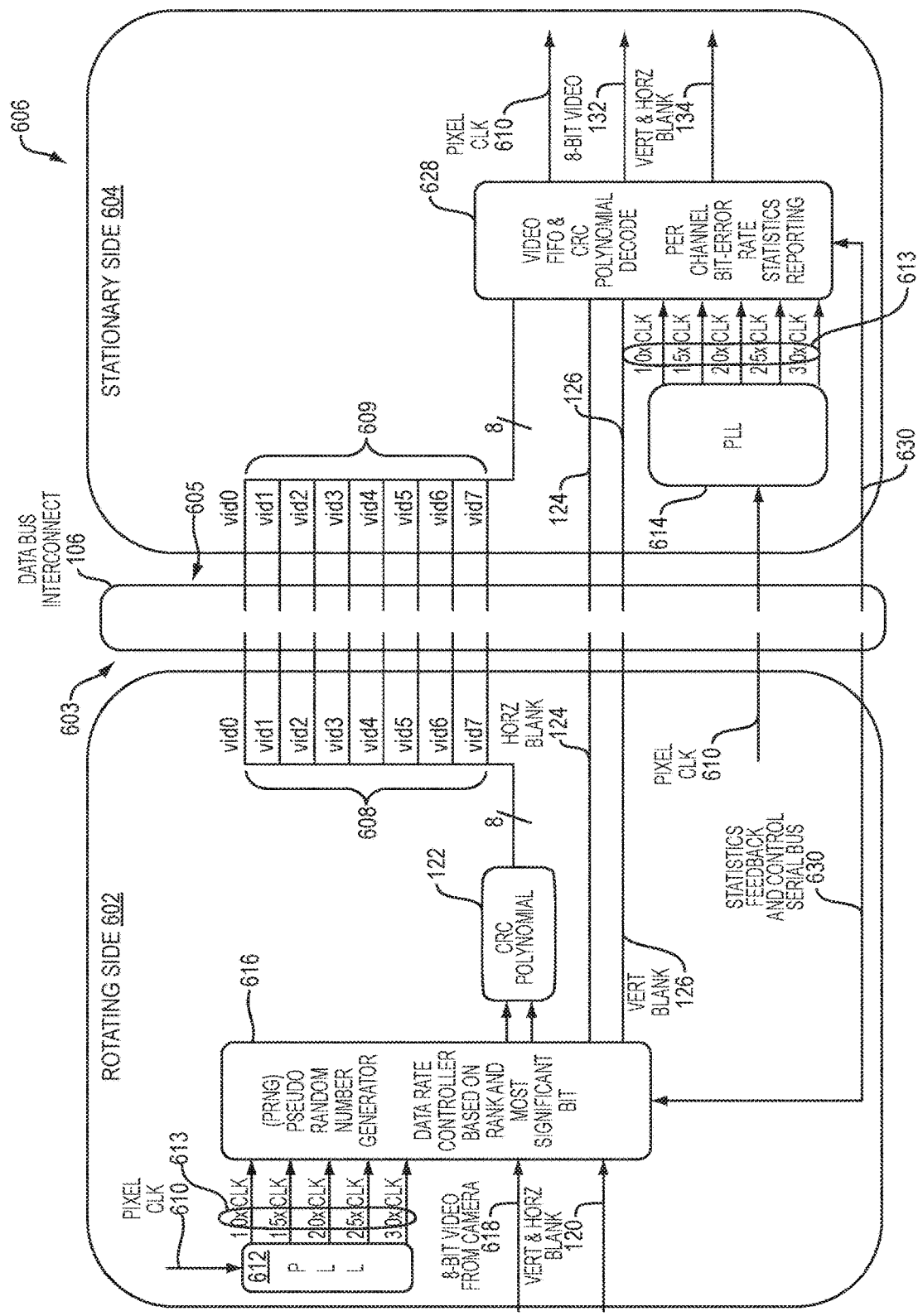
FIG. 6 is a schematic block diagram illustrating an apparatus for video load balancing according to an aspect of the present disclosure.

An example of an apparatus for video load balancing is configured to perform the method described in FIG. 5. Referring to FIG. 6, the apparatus includes a data bus interconnect 606 including a plurality of video transport channels 608, 609 and a pixel clock channel 610 extending between an upstream processing module 603 of the data bus interconnect 606 and a downstream processing module 605 of the data bus interconnect 606. An upstream processing module 602 is coupled between a video camera and the upstream processing module 603 of the data bus interconnect 606. A downstream processing module 604 is coupled to the downstream processing module 606 of the data bus interconnect.

The upstream module 602 may be configured to receive a video data input signal from one or more cameras. According to an aspect of the present disclosure, the upstream processing module 602 is configured to receive a feedback signal from downstream processing module 604. The feedback signal includes channel integrity information for each of the plurality of the video transport channels. For each of the video transport channels the upstream processing module is configured to distribute a portion of the video data input signal to the respective video transport channel. According to an aspect of the present disclosure, the amount of video data in the portion and the data rate of the portion is based on the channel integrity information associated with the channel.

According to an aspect of the present disclosure, the downstream processing module 604 is configured to perform a channel integrity check for each of the video transport channels 608, 609 and determine an updated channel integrity information for each of the video transport channels 608, 609 based on channel integrity check.

During a video blanking period, the downstream processing module 604 is configured to communicate the updated channel integrity information for each of the video transport channels 608, 609 from the downstream processing module of the data bus interconnect to the upstream processing module of the data bus interconnect.

In an illustrative embodiment the upstream processing module 602 is also configured to determine whether the video data input signal represents a video blanking period. The upstream processing module 602 sends a random or pseudorandom signal to of the video transport channels 608, 609 during the video blanking period along with cyclical redundancy check information corresponding to the random or pseudorandom signal on the respective channel from the upstream processing module 602 to the downstream processing module 604. According to an aspect of the present disclosure, the random or pseudorandom signal and cyclical redundancy check information are sent at a plurality of predetermined multiples of the pixel clock rate.

In the illustrative embodiment, the downstream processing module 604 is configured to perform a cyclical redundancy check for each of the video transport channels 608, 609 based on the random or pseudorandom signals and the cyclical redundancy check information at each of the predetermined multiples of the pixel clock rate. The downstream processing module 604 is configured to determine a maximum one of the predetermined multiples of the pixel clock rate clock rates at which the cyclical redundancy check determines a bit error rate below a predetermined threshold of data integrity and to include the maximum data rate of the channel in the updated channel integrity information.

According to an aspect of the present disclosure, for each of the video transport channels 608, 609 the upstream processing module is further configured to update the data rate of the respective channel to the maximum data rate of the channel identified in the updated channel integrity information associated with the channel, and/or update the amount of video data in the portion based on the updated channel integrity information associated with the channel.

Figure 7:
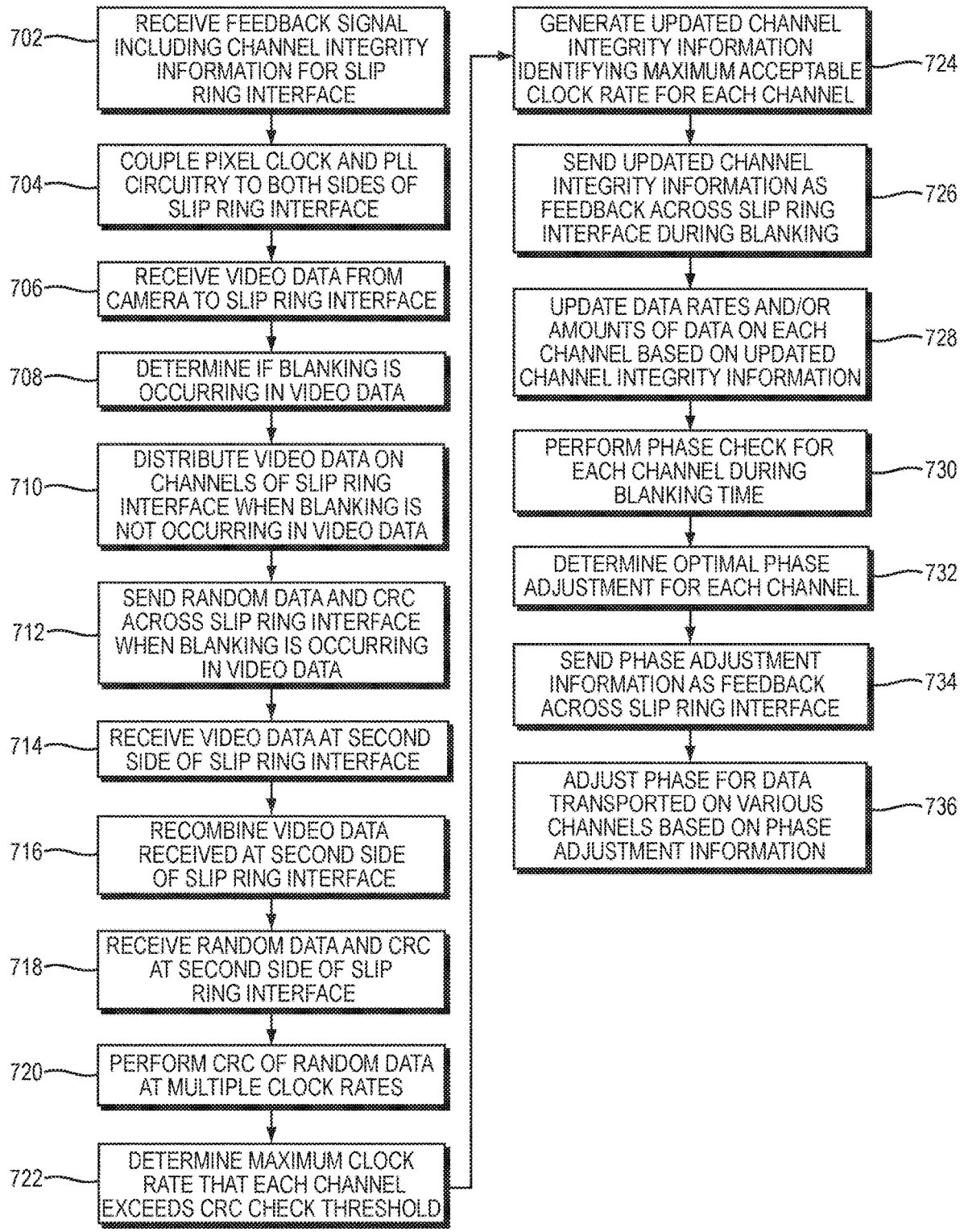
FIG. 7 is a process flow diagram illustrating a method of dynamic load balancing on data bus interconnect in a dynamic impedance environment according to an aspect of the present disclosure.

A method of dynamic load balancing on a data bus interconnect in a dynamic impedance environment according to an aspect of the present disclosure is descried with reference to FIGS. 6 and 7.

At block 702, the method includes receiving at an upstream processing module 602 of a data bus interconnect 606 a feedback signal from a downstream processing module 602 of the data bus interconnect 606 via a feedback path 630. In an illustrative embodiment, the data bus interconnect 606 may comprise a slip ring interconnect 603, for example. The feedback signal includes channel integrity information for each of a plurality of video transport channels 608, 609 extending from the upstream processing module 602 to the downstream processing module 604.

At block 704, the method includes coupling a pixel clock 610 to phased locked loop circuitry 612 on the upstream processing module 602 and to phased locked loop circuitry 614 on the downstream processing module 604 of the data bus interconnect 606. The phased locked loop circuitry 612 on the upstream processing module 602 and the phased locked loop circuitry 614 on the downstream processing module 604 generate a plurality of phase locked clock signals 613 having predetermined multiples of the pixel clock rate. At block 706, the method includes receiving at the upstream processing module 602 a video data input signal from one or more cameras coupled to a video data input path 618 of the upstream processing module 602 of the data bus interconnect. At block 708, the method includes determining whether the video data input signal represents a video blanking period.

At block 710, the method includes distributing, by upstream processing circuitry 616, a portion of the video data input signal to a video transport channel for each of the video transport channels when the video data input signal does not represent a video blanking period. The amount of video data in the portion and the data rate of the portion is based on the channel integrity information associated with the channel.

At block 712, when the video data input signal represents a video blanking period the method includes, for each of the video transport channels, the upstream processing circuitry 616 sends a random or pseudorandom signal along with cyclical redundancy check information corresponding to the random or pseudorandom signal on the channel 608, 609 from the upstream processing module 602 to the downstream processing module 604 at each of the predetermined multiples of the pixel clock rate.

At block 714, the method includes receiving at the downstream processing module 604 on each of the video transport channels 609 the portion of the video data input signal distributed to the corresponding video transport channel 608. At block 716, the downstream processing circuitry 628 includes recombines the portions of the video data input signal received on the plurality of video transport channels 609 based on the channel integrity information associated with each channel 609.

At block 718, the method includes receiving at the downstream processing module 604 on each of the video transport channels 609, the random or pseudorandom signals and the cyclical redundancy check information associated with the corresponding video transport channels 609 at each of the predetermined multiples of the pixel clock rate. At block 720, the downstream processing circuitry 628 performs a cyclical redundancy check of the random or pseudorandom signals on each of the video transport channels 609 for each of the predetermined multiples of the pixel clock rate.

At block 722, the method includes, the downstream processing circuitry 628 determines a maximum one of the predetermined multiples of the pixel clock rate clock rates at which the cyclical redundancy check determines a bit error rate below a predetermined threshold of data integrity for each of the video transport channels.

At block 724, the downstream processing circuitry 628 generating updated channel integrity information for each of the video transport channels 609 based on the corresponding cyclical redundancy checks. The updated channel integrity information identifies a maximum data rate of the channel as the maximum one of the predetermined multiples of the pixel clock rate clock rates at which the cyclical redundancy check determines the bit error rate below the predetermined threshold of data integrity.

At block 726, the method includes communicating the updated channel integrity information for each of the plurality transport channels 608, 609 from the downstream processing module 604 of the data bus interconnect 606 to the upstream processing module 602 of the data bus interconnect 606 during a video blanking period.

At block 728, the upstream processing module 606 updates the data rate for each of the video transport channels 608, 609 to the maximum data rate of the respective channel identified in the updated channel integrity information associated with the channel, and/or updates the amount of video data in the portion based on the updated channel integrity information associated with each channel.

At block 730, the downstream processing circuitry 628 performs a phase check during the blanking time for each of the video transport channels 608, 609 at a predetermined multiple of the pixel clock rate that oversamples the random or pseudorandom signals and the cyclical redundancy check information.

At bock 732, the downstream processing circuitry 628 determines a phase adjustment for each of the video transport channels based on the corresponding phase check.

At block 734, the downstream processing circuitry 628 communicates the phase adjustment in the feedback signal from the downstream processing module 604 to upstream processing 606 module of the data bus interconnect 606.

At block 736, the upstream processing circuitry 616 adjusts the phase for data transported on each of the video transport channels based on the phase adjustment received from the downstream processing module 604 of the data bus interconnect apparatus.

The disclosed system and method provides near real-time dynamic load balancing based on frame by frame feedback of signal integrity statistics to achieve optimal video data rates across inherently unstable contact style data bus interconnection even when the data bus interconnection is under rotation. The disclosed system and method mitigates the inherent changing of signal integrity due to variable contact resistance, impedance, and capacitance across a mechanical data bus interface to improve data integrity across the data bus interconnect and accommodate transport ultra-high definition video data.

As widely deployed video systems get older, the disclosed system and method allows the continued use of their battle proven mechanical interfaces such as slip rings that may be partially defective. In addition to their utility in video data interconnects, the disclosed system and method may be implemented in various other dynamically changing interconnects having parallel data channels, such as interconnects in oil and gas drilling sensors at drill heads, for example.

What is claimed is:

1. A method for interconnecting video signal pathways, the method comprising:
   receiving at an upstream processing module of an interconnect apparatus a feedback signal from a downstream processing module of the interconnect apparatus via a feedback and control path between the upstream processing module of the interconnect apparatus and the downstream processing module of the interconnect apparatus, the feedback signal including channel integrity information for each of a plurality of video transport channels extending from the upstream processing module of the interconnect apparatus to the downstream processing module of the interconnect apparatus;
   receiving at the upstream processing module of the interconnect apparatus a video data input signal from one or more cameras coupled to the upstream processing module of the interconnect apparatus;
   for each of the plurality of video transport channels, distributing a portion of the video data input signal to the video transport channel, wherein the amount of video data in the portion and the data rate of the portion is based on the channel integrity information associated with the channel; and
   for each of the plurality of video transport channels, sending a random or pseudorandom signal along with cyclical redundancy check information corresponding to the random or pseudorandom signal on the channel from the upstream processing module of the interconnect apparatus to the downstream processing module of the interconnect apparatus.

2. The method of claim 1, comprising:
   detecting a video blanking period at the upstream processing module; and
   sending the random or pseudorandom signal along with the cyclical redundancy check information only during the video blanking period.

3. The method of claim 1, comprising:
   coupling a pixel clock to phased locked loop circuitry on the upstream processing module of the interconnect apparatus and to phased locked loop circuitry on the downstream processing module of the apparatus, wherein the phased locked loop circuitry on the upstream processing module of the interconnect apparatus and the phased locked loop circuitry on the downstream processing module of the apparatus generate a plurality of phase locked clock signals having predetermined multiples of the pixel clock rate; and
   sending the random or pseudorandom signals along with the cyclical redundancy check information at each of the predetermined multiples of the pixel clock rate.

4. The method of claim 1, further comprising:
   receiving at the downstream processing module of the interconnect apparatus, on each of the plurality of video transport channels the portion of the video data input signal distributed to the corresponding video transport channel; and
   recombining the portions of the video data input signal received on the plurality of video transport channels based on the channel integrity information associated with each channel.

5. The method of claim 1, further comprising:
   receiving at the downstream processing module of the interconnect apparatus on each of the plurality of video transport channels, the random or pseudorandom signals and the cyclical redundancy check information associated with the corresponding video transport channels at each of the predetermined multiples of the pixel clock rate; and
   performing a channel integrity check for each of the plurality of video transport channels based on the random or pseudorandom signals and the cyclical redundancy check information at each of the predetermined multiples of the pixel clock rate.

6. The method of claim 5, further comprising:
   determining an updated channel integrity information for each of the plurality of video transport channels based on channel integrity check; and
   communicating the updated channel integrity information for each of the plurality transport channels from the downstream processing module of the interconnect apparatus to the upstream processing module of the interconnect apparatus.

7. The method of claim 6, wherein performing the channel integrity check comprises:
   performing a cyclical redundancy check for each of the predetermined multiples of the pixel clock rate;
   determining a maximum one of the predetermined multiples of the pixel clock rate clock rates at which the cyclical redundancy check determines a bit error rate below a predetermined threshold of data integrity; and
   including the maximum data rate of the channel in the updated channel integrity information.

8. The method of claim 6, wherein for each of the plurality of video transport channels the updated channel integrity information identifies a maximum data rate of the channel as the maximum one of the predetermined multiples of the pixel clock rate clock rates at which the cyclical redundancy check determines the bit error rate below the predetermined threshold of data integrity.

9. The method of claim 7, further comprising:
for each of the plurality of video transport channels, updating the data rate of the channel to the maximum data rate of the channel identified in the updated channel integrity information associated with the channel.

10. The method of claim 7, comprising:
for each of the plurality of video transport channels, updating the amount of video data in the portion based on the updated channel integrity information associated with the channel.

11. The method of claim 6, wherein communicating the updated channel integrity information to the upstream processing module of the interconnect apparatus is performed only during the video blanking period.

12. The method of claim 6, further comprising comprises:
during the blanking time, performing a phase check for each of the plurality of video transport channels at a predetermined multiple of the pixel clock rate that oversamples the random or pseudorandom signals and the cyclical redundancy check information; and
determining a phase adjustment for each of the plurality of video transport channels based on the corresponding phase check; and
communicating the phase adjustment in the feedback signal from the downstream processing module of the interconnect apparatus to first downstream processing module of the interconnect apparatus.

13. The method of claim 12, comprising:
adjusting the phase for data transported on each of the plurality of video transport channels based on the phase adjustment received from the downstream processing module of the interconnect apparatus to first downstream processing module of the interconnect apparatus.

14. An apparatus for video load balancing, comprising:
a data bus interconnect including a plurality of video transport channels extending between an upstream processing module of the data bus interconnect and a downstream processing module of the data bus interconnect and a pixel clock channel extending between the upstream processing module of the data bus interconnect and the downstream processing module of the data bus interconnect;
an upstream processing module coupled between a video camera and the upstream processing module of the data bus interconnect; and
a downstream processing module coupled to the downstream processing module of the data bus interconnect;
wherein the upstream processing module is configured to:
receive a feedback signal from downstream processing module, the feedback signal including channel integrity information for each of a plurality of the video transport channels;
receive a video data input signal from one or more cameras coupled to the upstream processing module of the data bus interconnect; and
for each of the plurality of video transport channels, distribute a portion of the video data input signal to the video transport channel, wherein the amount of video data in the portion and the data rate of the portion is based on the channel integrity information associated with the channel.

15. The apparatus of claim 14, wherein the downstream processing module is configured to:
perform a channel integrity check for each of the plurality of video transport channels;
determine an updated channel integrity information for each of the plurality of video transport channels based on channel integrity check;
during a video blanking period, communicate the updated channel integrity information for each of the plurality transport channels from the downstream processing module of the data bus interconnect to the upstream processing module of the data bus interconnect;
detect a video blanking period; and
for each of the plurality of video transport channels, send a random or pseudorandom signal during the video blanking period along with cyclical redundancy check information corresponding to the random or pseudorandom signal on the channel from the upstream processing module of the data bus interconnect to the downstream processing module of the data bus interconnect at a plurality of predetermined multiples of the pixel clock rate.

16. The apparatus of claim 15, wherein the downstream processing module is further configured to:
for each of the plurality of video channels, perform a cyclical redundancy check based on the random or pseudorandom signals and the cyclical redundancy check information at each of the predetermined multiples of the pixel clock rate.

17. The apparatus of claim 16, wherein the downstream processing module is further configured to:
determine a maximum one of the predetermined multiples of the pixel clock rate clock rates at which the cyclical redundancy check determines a bit error rate below a predetermined threshold of data integrity; and
include the maximum data rate of the channel in the updated channel integrity information.

18. The apparatus of claim 17, wherein the upstream processing is further configured to:
for each of the plurality of video transport channels, update the data rate of the channel to the maximum data rate of the channel identified in the updated channel integrity information associated with the channel, and update the amount of video data in the portion based on the updated channel integrity information associated with the channel.

19. A method of dynamic load balancing on a data bus interconnect in a dynamic impedance environment, the method comprising:
receiving at an upstream processing module of the data bus interconnect a feedback signal from a downstream processing module of the data bus interconnect via a feedback path between the upstream processing module of the data bus interconnect and the downstream processing module of the data bus interconnect, the feedback signal including channel integrity information for each of a plurality of video transport channels extending from the upstream processing module of the data bus interconnect to the downstream processing module of the data bus interconnect;
coupling a pixel clock to phased locked loop circuitry on the upstream processing module of the data bus interconnect and to phased locked loop circuitry on the downstream processing module of the data bus interconnect, wherein the phased locked loop circuitry on the upstream processing module of the data bus interconnect and the phased locked loop circuitry on the downstream processing module of the data bus interconnect generate a plurality of phase locked clock signals having predetermined multiples of the pixel clock rate;

receiving at the upstream processing module of the data bus interconnect a video data input signal from one or more cameras coupled to the upstream processing module of the data bus interconnect;

detecting a video blanking period;

when the video data input signal does not represent a video blanking period, for each of the plurality of video transport channels, distributing a portion of the video data input signal to the video transport channel, wherein the amount of video data in the portion and the data rate of the portion is based on the channel integrity information associated with the channel;

when the video data input signal represents a video blanking period, for each of the plurality of video transport channels, sending a random or pseudorandom signal along with cyclical redundancy check information corresponding to the random or pseudorandom signal on the channel from the upstream processing module of the data bus interconnect to the downstream processing module of the data bus interconnect at each of the predetermined multiples of the pixel clock rate;

receiving at the downstream processing module of the data bus interconnect, on each of the plurality of video transport channels the portion of the video data input signal distributed to the corresponding video transport channel;

recombining the portions of the video data input signal received on the plurality of video transport channels based on the channel integrity information associated with each channel;

receiving at the downstream processing module of the data bus interconnect on each of the plurality of video transport channels, the random or pseudorandom signals and the cyclical redundancy check information associated with the corresponding video transport channels at each of the predetermined multiples of the pixel clock rate;

performing a cyclical redundancy check of the random or pseudorandom signals on each of the plurality of video transport channels for each of the predetermined multiples of the pixel clock rate;

for each of the plurality of video transport channels, determining a maximum one of the predetermined multiples of the pixel clock rate clock rates at which the cyclical redundancy check determines a bit error rate below a predetermined threshold of data integrity;

generating updated channel integrity information for each of the plurality of video transport channels based on the corresponding cyclical redundancy checks, wherein the updated channel integrity information identifies a maximum data rate of the channel as the maximum one of the predetermined multiples of the pixel clock rate clock rates at which the cyclical redundancy check determines the bit error rate below the predetermined threshold of data integrity;

communicating the updated channel integrity information for each of the plurality transport channels from the downstream processing module of the data bus interconnect to the upstream processing module of the data bus interconnect during a video blanking period; and for each of the plurality of video transport channels, updating the data rate of the channel to the maximum data rate of the channel identified in the updated channel integrity information associated with the channel, and updating the amount of video data in the portion based on the updated channel integrity information associated with the channel.

20. The method of claim 19, further comprising:

during the blanking time, performing a phase check for each of the plurality of video transport channels at a predetermined multiple of the pixel clock rate that oversamples the random or pseudorandom signals and the cyclical redundancy check information;

determining a phase adjustment for each of the plurality of video transport channels based on the corresponding phase check;

communicating the phase adjustment in the feedback signal from the downstream processing module of the data bus interconnect to first downstream processing module of the data bus interconnect; and adjusting the phase for data transported on each of the plurality of video transport channels based on the phase adjustment received from the downstream processing module of the data bus interconnect apparatus to first downstream processing module of the data bus interconnect.

\* \* \* \* \*